United States Patent [19]
Farley

[11] Patent Number: 6,105,085
[45] Date of Patent: Aug. 15, 2000

[54] LOCK MECHANISM FOR SHARED RESOURCES HAVING ASSOCIATED DATA STRUCTURE STORED IN COMMON MEMORY INCLUDE A LOCK PORTION AND A RESERVE PORTION

[75] Inventor: Martin Farley, Wellesley, Mass.

[73] Assignee: EMC Corporation, Hopkinton, Mass.

[21] Appl. No.: 08/998,538

[22] Filed: Dec. 26, 1997

[51] Int. Cl.[7] .................................................. G06F 3/00
[52] U.S. Cl. ........................... 710/41; 709/229; 710/200; 711/150; 711/163
[58] Field of Search .............................. 710/36, 200, 41; 711/163, 150; 709/213, 229

[56] References Cited

U.S. PATENT DOCUMENTS

| | | | |
|---|---|---|---|
| 4,574,350 | 3/1986 | Starr | 710/200 |
| 5,317,749 | 5/1994 | Dahlen | 710/200 |
| 5,442,755 | 8/1995 | Shibata | 710/108 |
| 5,592,673 | 1/1997 | Kurabayashi et al. | 710/200 |
| 5,613,139 | 3/1997 | Brady | 710/200 |
| 5,669,002 | 9/1997 | Buch | 710/200 |
| 5,892,955 | 4/1999 | Ofer | 710/200 |

FOREIGN PATENT DOCUMENTS

| | | | |
|---|---|---|---|
| 63-259758 | 10/1988 | Japan | G06F 15/16 |

*Primary Examiner*—Thomas C. Lee
*Assistant Examiner*—Albert Wang
*Attorney, Agent, or Firm*—John M. Gunther; Leanne J. Fitzgerald

[57] ABSTRACT

A shared resource lock mechanism is provided which enables processors in a multi-processor environment which each share common resources to obtain locks on those resources. The lock mechanism also includes a reserve feature which provides a mechanism for a processor to maintain a lock on a resource for several input/output cycles. The lock mechanism combines the lock feature and the reserve feature in a single structure. This combination allows a processor to manipulate both the lock data and reserve data in a single transaction. Thus, in transactions requiring manipulation of both the lock and reserve elements, overhead is significantly reduced. In addition a unification of software routines which manipulate the lock and reserve data is achieved.

4 Claims, 6 Drawing Sheets

DEVICE LOCK WORD 41

| STATE | LOCK GROUP ID # | 'L' | CTRLR # | LP/IN_ID | 0 | RESERVE FLAGS |
|---|---|---|---|---|---|---|
| BYTE 0 | BYTE 1 | BYTE 2 | BYTE 3 | BYTE 4 | BYTE 5 | BYTE 6 · BYTE 7 |

| STATE | LOCK GROUP ID # | 'L' | CTRLR # | LP/IN_ID | 0 | RESERVE FLAGS |
|---|---|---|---|---|---|---|
| BYTE 0 | BYTE 1 BYTE 2 | BYTE 3 | BYTE 4 | BYTE 5 | BYTE 6 | BYTE 7 |

DEVICE LOCK WORD 41

FIG. 4

LOCK MECHANISM FOR SHARED RESOURCES HAVING ASSOCIATED DATA STRUCTURE STORED IN COMMON MEMORY INCLUDE A LOCK PORTION AND A RESERVE PORTION

BACKGROUND OF THE INVENTION

This invention relates generally to data processing systems and more particularly to a method and apparatus for flexible, unified lock mechanism for accessing logical devices within a data storage system.

As it is known in the art, data processing systems generally include several types of processing resources which may be interconnected by one or more communication busses. In addition to the processor resources, data processing systems also generally include some sort of memory which is typically shared amongst the processor resources. As is common in many computer systems these processing resources may act independently to perform different processing tasks. Since each of the processing resources may act independently there may arise a situation where there is contention for the shared memory resources within the system.

One example of a data processing system which includes several processing resources coupled to a common memory over one or more busses are data storage systems such as the Symmetrix family of data storage systems manufactured by EMC Corporation. These storage systems are typically capable of being coupled to several different host computers at any given time and provide storage services to each of those computers independently. In order to support transactions between a plurality of host computers simultaneously the storage system includes several host controllers for managing the communication between the host computer and the storage system. In addition, the Symmetrix storage systems mentioned above include several disk controllers which are each responsible for managing one or more arrays of disk type storage devices.

In addition to the host controllers and disk controllers mentioned above the storage subsystem may also contain a very large global memory which is used to manage the transfer of data from the host computers to the storage devices as well as to manage the transfer of data from the storage devices to the host computer.

During the operation of the data storage system described above, in order to read or write data to a particular device in the storage system, it is often necessary for any one or the host computers to obtain a lock on a that particular device. Locking a device is often necessary to insure channel (i.e. communications over a path) serialization. One method known in the art for providing a lock on a storage device is to utilize a device lock data structure along with a reserve data structure. Locking a device then would require at least writing data to the lock structure and in some instances, writing data to the reserve data structure. The reserve data structure would typically be used to ensure a lock on a particular device throughout several input/output (I/O) transactions between a host computer and the particular device. Here, once one host reserved a particular device, no other host would be able to gain a lock on the device, and no other device could force a reset of the lock. Thus, in some instances two complete data transactions are required at the beginning of each I/O. When the host was finished with its data transaction with the locked device, it would then need to release both the lock and the reserve. The end of an I/O would then require two additional I/O operations.

In systems that employ locks, often a command other than an unlock command from the setting host (e.g. system command) may be utilized to reset a lock by modifying the associated lock record. Since there are two separate data structures for the lock and the reserve, a situation can arise where a lock has been released without the appropriate release of the reserve. This leads to a data integrity problem and a loss of access to a particular device when no host actually is using the device for data transactions, since as described above, when a device is reserved, no other host may lock the device for access.

It would be advantageous therefore to provide a data processing system which employs an efficient and reliable system of locks in order to provide access to shared resources such as storage devices.

SUMMARY OF THE INVENTION

In accordance with the present invention, a lock mechanism for managing shared resources in a data processing system is provided. The lock mechanism provides, in a single structure, the resources needed to both lock and reserve a resource. The reserve feature allows a resource to be locked for several I/Os without having to release and relock the resource for each transaction. In one aspect of the present invention, a method of providing lock services for shared resources, where the resources may be locked over several input/output (I/O) transactions includes providing, for every one of the resources, an associated lock structure stored in a memory and accessible by a plurality of requesting devices. The said lock structure includes a lock portion and a reserve portion. The method also includes setting, by one of the requesting devices a hardware lock on a memory location corresponding to a particular one of the lock structures associated with a desired resource. After the hardware lock is acquired, the contents of the lock structure are examined to determine if another requesting device has previously locked the desired resource. If no other requesting device has previously locked the desired resource, then, in a single transaction, lock data and reserve data are written to the to said lock portion and the reserve portion respectively. After the lock and reserve information is written, the hardware lock is released. With such an arrangement, a resource may be locked and reserved using a single transaction, thus dramatically reducing the processing overhead associated with I/Os to the resource. Furhtermore, unification of the software routines which manage the locks of the present invention may be achieved.

BRIEF DESCRIPTION OF THE DRAWINGS

The above and further advantages of the present invention may be better understood by referring to the following description taken into conjunction with the accompanying drawings in which:

FIG. 4 is a block diagram of an exemplary one of the lock mechanisms included in a memory of the storage system of FIG. 2.

DETAILED DESCRIPTION OF THE PREFERRED EMBODIMENT

Figure 1:
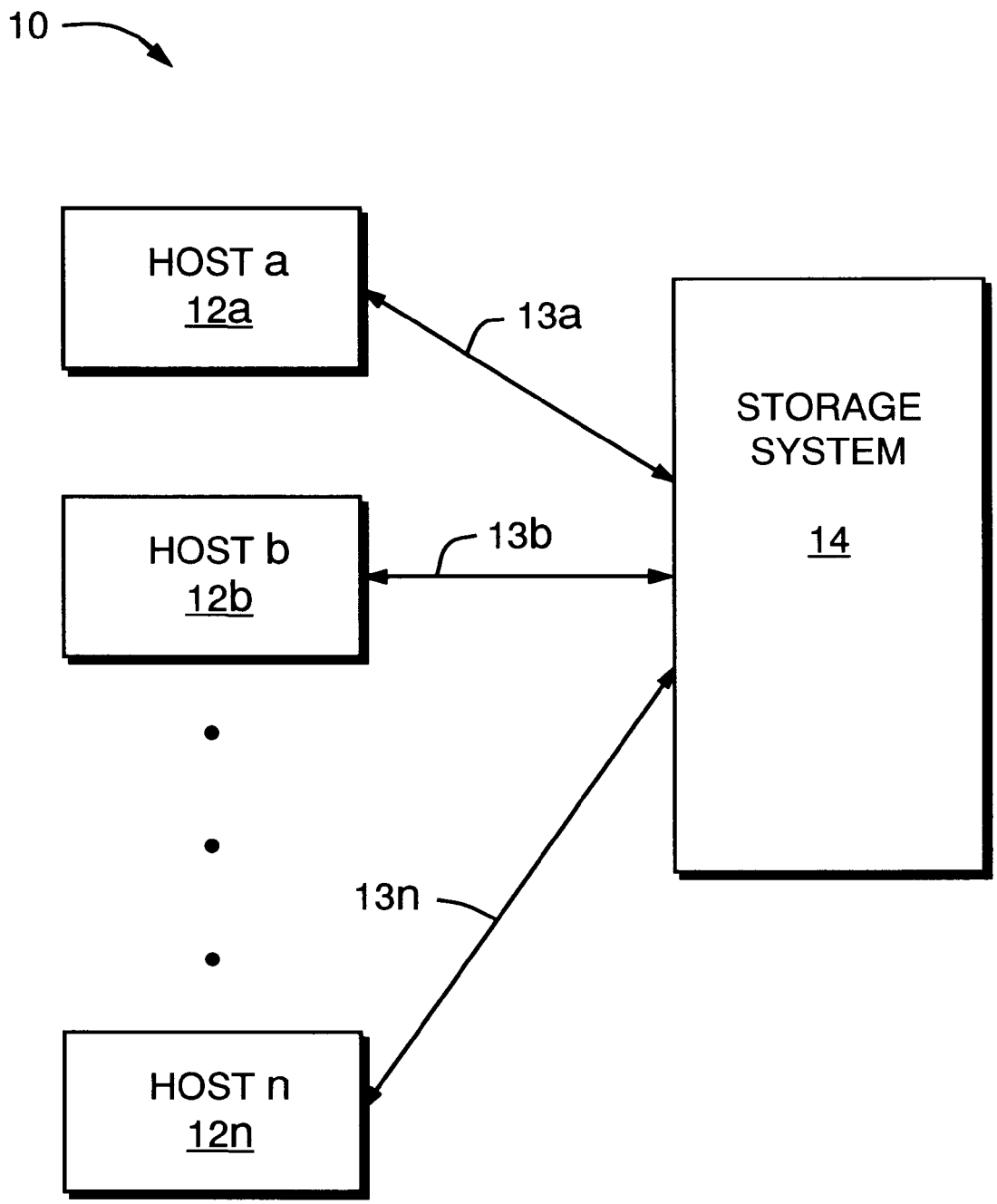
FIG. 1 is a block diagram of a preferred embodiment of the data processing system incorporating the present invention.

Referring now to FIG. 1, computer system 10 is shown to include, among other things, a plurality of host computers 12a–12n, coupled to a storage system 14 via communication paths or busses 13a–13n respectively. The host computers may each be any of a well-known type of computer system. For example, host 12a may be a mainframe computer or may be an open-systems computer or alternatively may be a personal computer. Since each of the computer systems just mentioned typically communicates using a specific communication protocol buses 13a–13n will correspondingly be those buses specific to the computer system to which they are coupled. That is for example, assuming host 12b is an open-systems type computer system (e.g. running the UNIX Operating System) bus or communication path 13b would typically be a SCSI type communications path or a fiber-channel communications path. All communications over bus 13b would therefore adhere to either the SCSI or fiber-channel communications protocols respectively.

Figure 2:
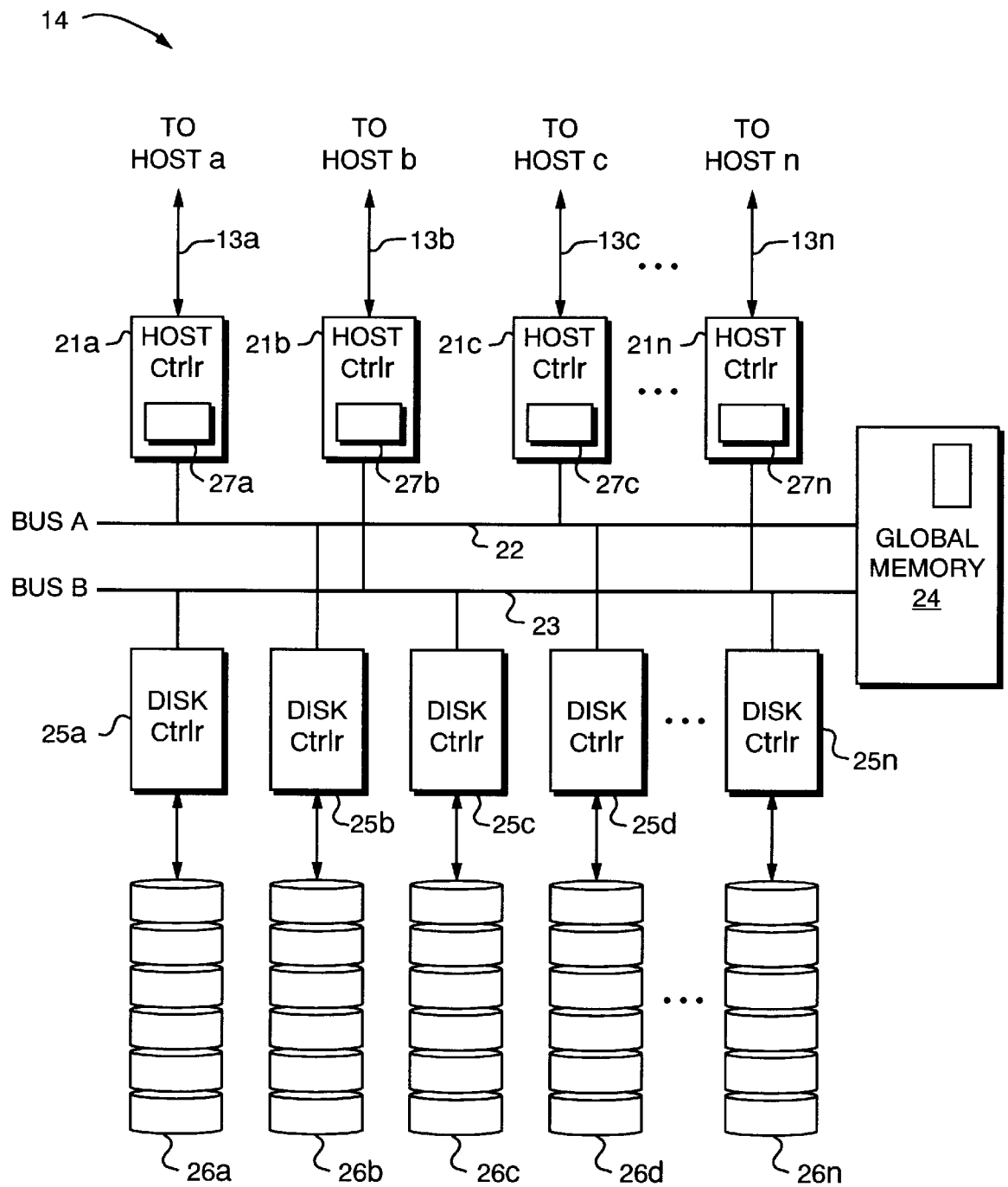
FIG. 2 is a block diagram of a preferred embodiment of the storage system incorporating the present invention.

The storage system 14 of computer system 10 may be a mass storage system which, as will be described in more detail below, includes several individual components coupled via an internal communications path. The communications path according to the preferred embodiment may include one or more buses. Referring now to FIG. 2 the storage system 14 of FIG. 1 is shown in more detail. Here the storage system includes a plurality of host controllers 21a–21n which are, according to a preferred embodiment of the present invention, coupled alternately to buses 22 and 23. Each host controller 21a–21n is responsible for managing the communication between its associated attached host computers and storage system 14. The host controllers of the preferred embodiment may include on or more central processing units (CPUs). The controller CPUs operate under program control to manage the flow of data between an associated host computer and the storage system 14. Each host controller 21a–21n may also include an internal queue 27a14 27n respectively. As will be described in more detail below, the internal queue is used to store incoming requests from an attached host computer until the request can be serviced by the storage system.

Also coupled alternately to buses 22 and 23 are a plurality of disk controllers 25a–25n. Controllers 25a–25n are here similar in construction to controllers 21a–21n. That is, each includes at least one CPU configured to operate under control of a program loaded into an associate CPU program memory. Coupled to each disk controller 25a–25n is an array of storage devices 26a–26n which as shown here may be magnetic disk devices. Like the host controllers described above, each disk controller is responsible for managing the communications between its associated array of disk drives and the host controllers or memory 24 of storage system 14.

In the storage system of the preferred embodiment, each physical storage device may include one or more logical devices. A logical device is an identification by which the attached host computers refer to the storage devices. A logical device may be a portion of a physical device or may include and entire physical device. In some instances, a logical device may also span several physical devices.

In addition to the controllers described above, storage system 14 also includes a global memory 24 coupled to both buses 22 and 23. According to a preferred embodiment of the present invention, a portion of global memory 24 serves as a very large cache. The cache is used as a staging area during the transfer of data between the host computers and the storage devices of disk arrays 26a–26n. In addition, the global memory includes a number of single entry queues or device records. Each logical device of storage system 14 has an associated device header data structure in memory 24. The device headers are here the means by which the host controller communicates with the associated logical devices. That is, in order for a host controller to send a request for data to a particular device, the host controller will arbitrate for access to one of the busses 22, 23 in order to communicate with memory 24. Once access is granted, and as will be described in detail below, the host controller will attempt to set a lock on the target device associated with the data transaction. Once locked, the host controller places its request in a device request portion of the device header. The associated disk controller then reads the request from the device header and performs the data transaction.

Figure 3:
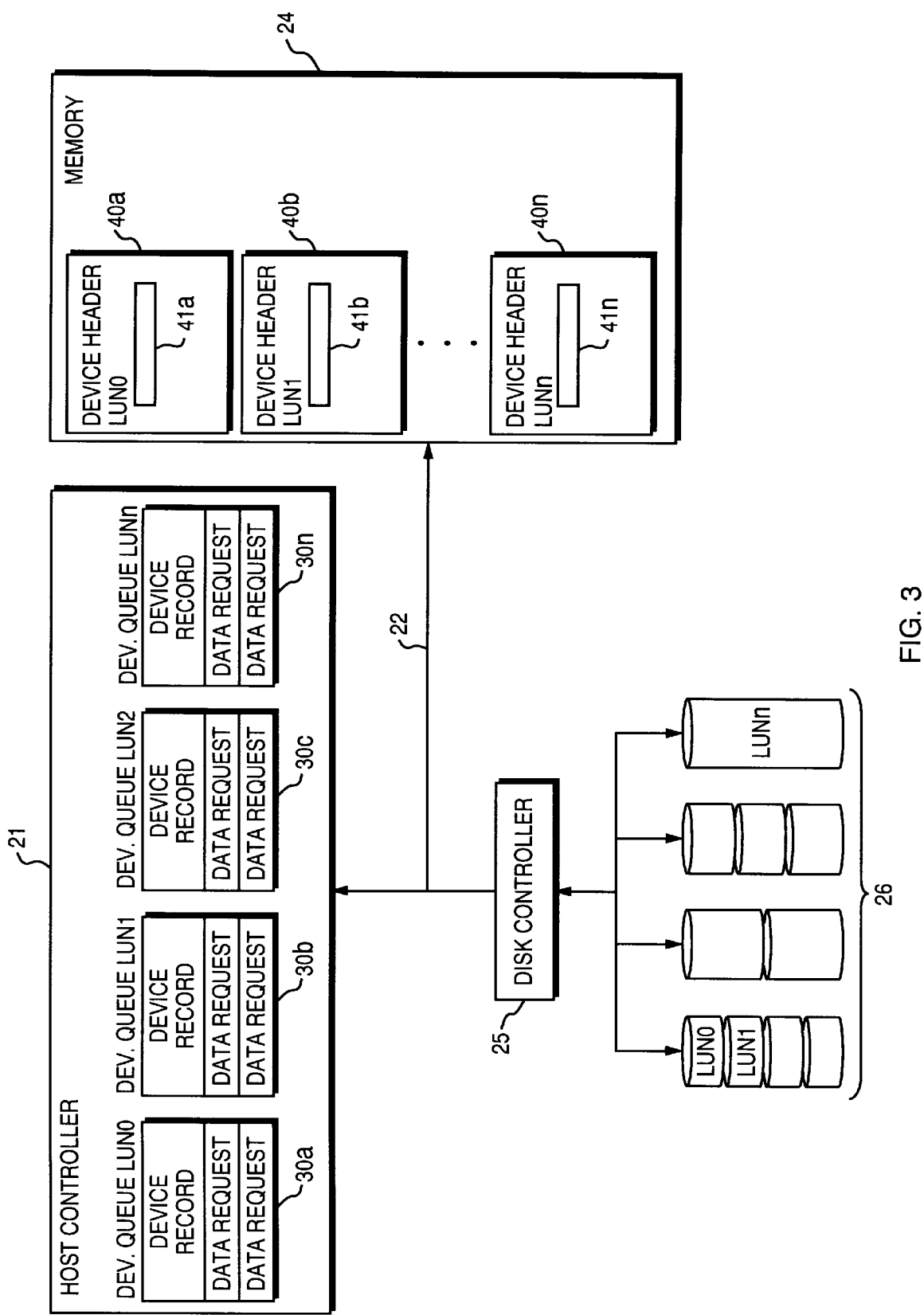
FIG. 3 is a block diagram of exemplary ones of the memory and controllers of the storage system of FIG. 2.

Referring now to FIG. 3, an exemplary host controller 21 is shown to include a plurality of device records 30a through 30n. The actual number of device records corresponds to the number of logical devices which may be accessed by host controller 21. In the preferred embodiment the logical devices are created during a configuration procedure wherein the logical devices available to each host controller are established and assigned. With this information, the host controller creates a device queue for each logical device for which is has access. Each device record is used to store data requests received from the host computer which are directed to a particular logical device. Generally, when host controller 21 receives a data request from the host computer it identifies which logical device is the target of the data request by examining the address sent by the host. The request is then placed in the appropriate request queue. For example, a data request to logical device zero may be stored in device record 30a.

As described earlier memory 24 includes a plurality of device headers 40a through 40n where each device header is associated with a particular logical device. Thus the total number of device headers in memory 24 corresponds to the total number of logical devices in storage system 14. Each request for read or write of data to a particular logical device requires that the request be placed in the appropriate device header (i.e. mailbox within the device record) corresponding to that logical device. However, as will described below, before a host controller places an entry in a mailbox of the device header it must first obtain a lock on the associated device and prevent any other host controller from placing an entry in the device header.

Still referring to FIG. 3, each device header 40a–40n is shown to include a lock 41a–41n respectively. Each time host controller receives a request from a host computer, that request will be targeted to a particular logical device of the array 26. As described earlier, in order for the controller 21 to gain access to a particular logical device, it must first obtain a lock on that device. According to a preferred embodiment of the present invention, the process of obtaining a lock on a logical device is accomplished by utilizing a software routine running on the CPU of controller 21 which writes certain data to the lock record of the particular logical device. The process performed by the controller generally includes a first step of checking the lock record to see if another controller currently has a lock on the device. If no other controller has locked the device, the first controller will lock it.

According to the present invention, a new lock record and associated lock process are provided. Referring now to FIG. 4, an exemplary lock record according to the preferred embodiment the present invention is shown. The lock record is here eight bytes in length. In accordance with the present invention and as shown in the figure, the lock record of the present invention includes information which allows a user to perform both the lock and reserve functions using a single lock record. One immediate advantage to this type of structure is that, with the appropriate use, locking and reserving functions can be performed in a single transaction. Another benefit is the unification of the software which may be utilized to manipulate the locks and reserve.

As stated earlier, the lock structure 41 is here eight bytes in length. The first byte, Byte 0 is used to store the current state of the device. Here the state is used to indicate whether the device is operating in single path or multi-path mode. If a device is in single path mode, it would respond to a request to a host request through the same host controller which placed the request in the device record. Referring back FIG. 2, if a logical device received a request via a particular I/O port on controller 21a, then in single path mode, the request would be answered via the same I/O port of controller 21a. On the contrary, if a device was operating in multi-path mode, a request received via 21a might be answered via any one of the I/O ports on any one of the controllers 21a–21n.

Bytes 1 and 2 of lock record 41 are used to identify the permissible paths by which a device may communicate with a particular host. This information is valid when a device is in multi-path mode. Here a path identifies a particular port over which communications are received from a host. In the preferred embodiment, each controller supports up to four ports (i.e. four host connections). In many instance a single host may be coupled more than one port. Thus, in multi-path mode, the permissible ports of communication are identified for each transaction with a logical device.

Byte 3 of lock record 41 hold the lock status of the associated logical device. A value of "L" indicates that the device is locked. Before a host controller may set a lock on a device, it must first check to see if the device has already been locked by another controller. This may be accomplished by reading the lock record and examining the lock status byte. If the device has been previously locked, the controller may then enter a wait cycle until the lock is released. In order to place a request into the device record, the controller will set the lock byte by writing an "L" to Byte 3. In addition, the remaining information for bytes 0–2 and 4–7 should be entered as well.

Bytes 4 of lock record 41 is use to store the identification of the controller which currently owns the lock on the device (i.e. the controller by which the request was received). Byte 5 of lock record 41 is used to store the identification of the path over which the request was received. That is, it identifies the particular port of the host controller which received the request from the host computer. When the storage system is operating in single-path mode, the response to the host request must be service through the same port that the request was received on.

Byte 6 of the lock record is here unused. In the case that additional ports or controllers are available in the storage system, this byte may be used to expand the storage for bytes 4 and or 5. Byte 7 of lock record 41 is, according to the present invention, used to store reserved information as reserve flags. As explained previously, the reserve information provides a means for a host to maintain a lock on a logical device during several I/O cycles. As is readily apparent, by integrating the reserve information into the lock record 41, a single point for lock maintenance is provided. Additionally, by combining the previously separate lock record and reserve word a single transaction may be used to set or reset both the lock and reserve information.

Figure 5A:
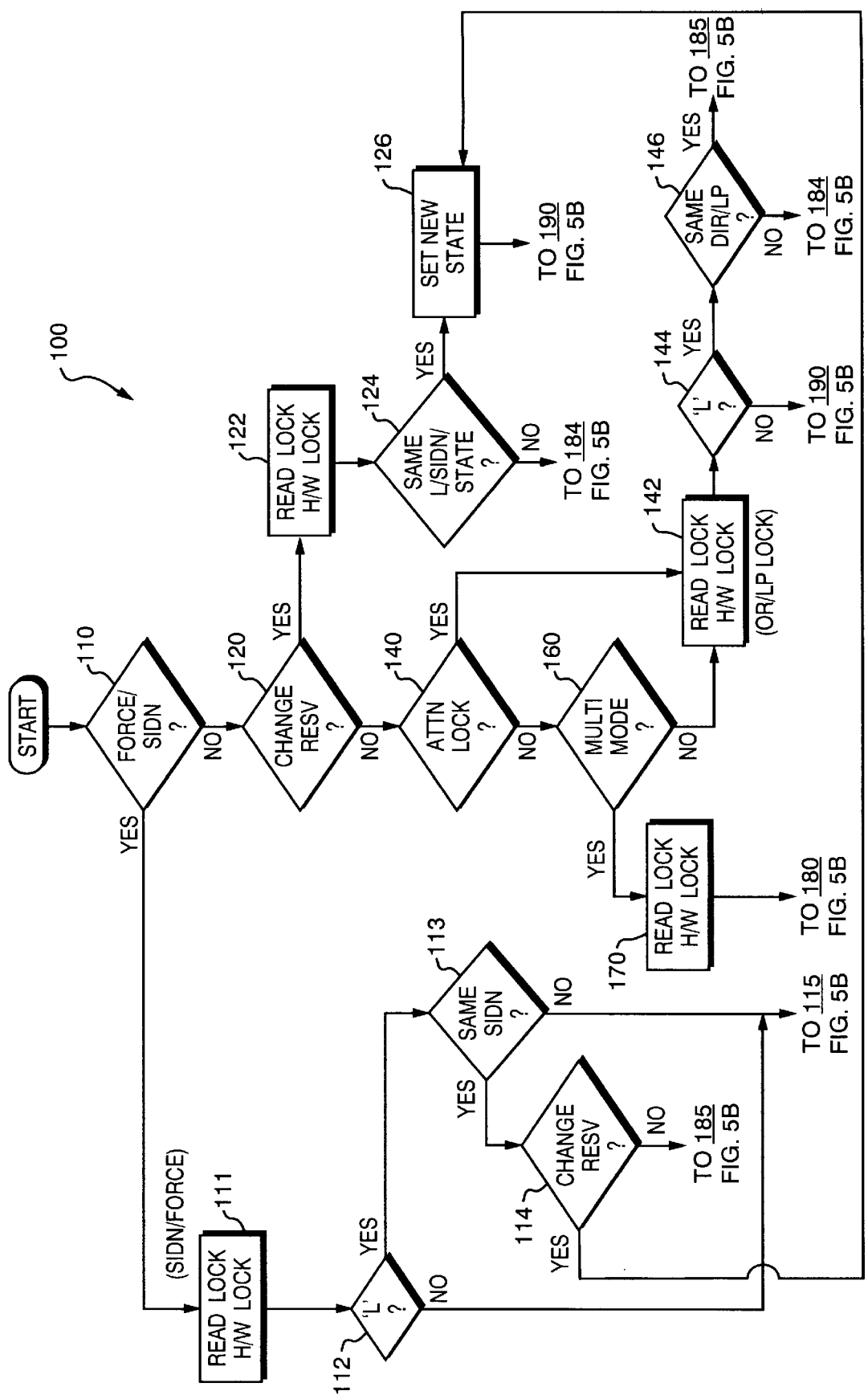
FIG. 5 is a flowchart showing the operation of the storage system of FIG. 2 in using the lock mechanism of the present invention.
Figure 5B:
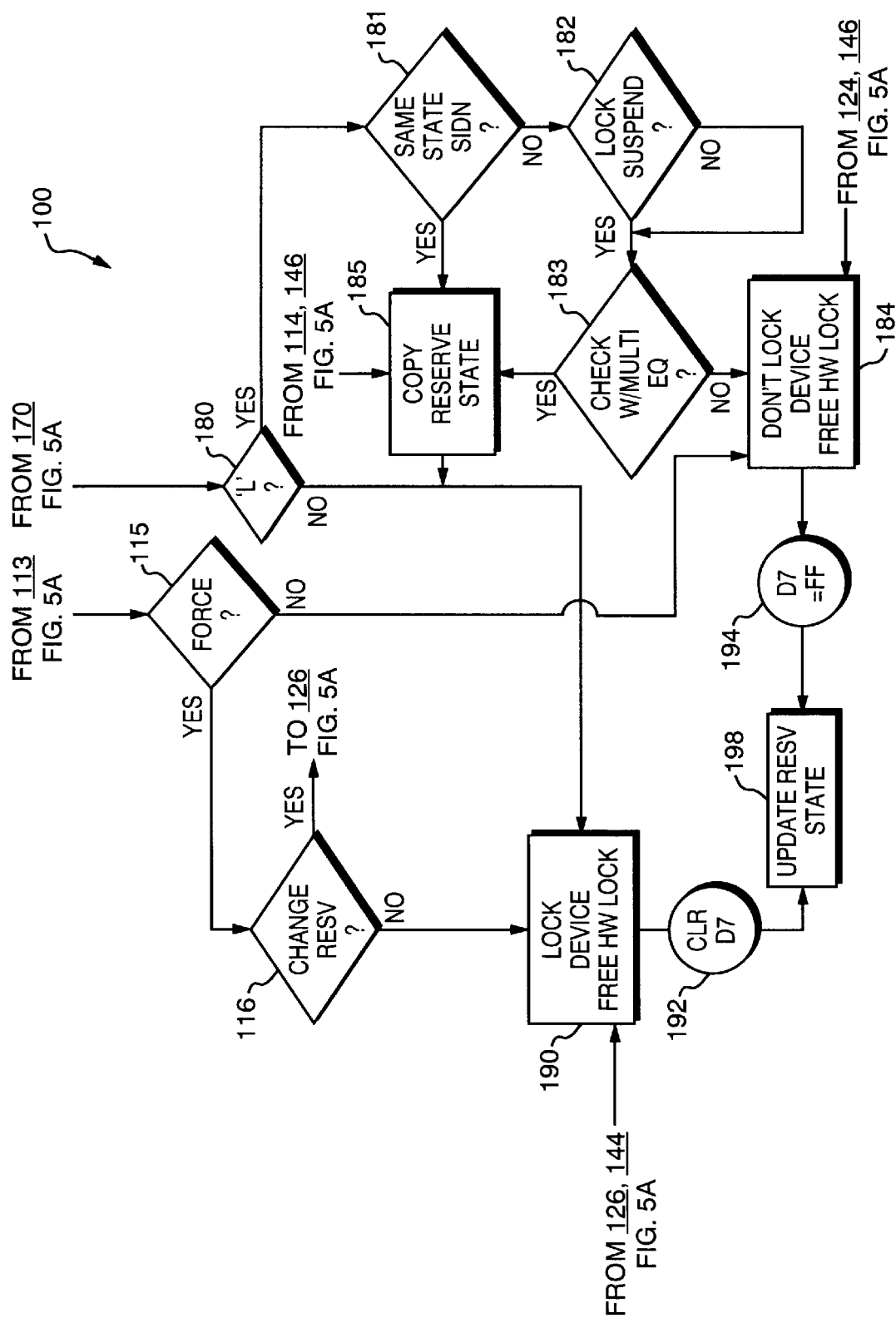

Referring now to FIG. 5, the operation of the lock mechanism of the present invention will now be described in connection with flowchart 100. At the start of the process, one of the host controllers of the storage system has received an I/O request from an associated host computer. In order to service the request, the host controller must communicate with the logical device which is the target of the I/O. A first check is performed at step 110. Here values for the force flag and group id number (GIDN) are checked. It should be noted that in the preferred embodiment, these values are passed to the lock mechanism software routine. This initial check (as well as checks at steps 120, 140, and 160) are used to determine what type of lock request has been received and thus which process flow is to be taken in managing the lock on the device.

Continuing with step 110, at this step, if it is determined that a group request or a force request has been received, the process moves to step 111 where a read of the lock record is performed using a hardware lock on the memory location storing the lock. The hardware lock is used to ensure that no other process changes the lock while it is being read. Here, at step 111, if the process (i.e. the requesting host controller) is not able to get the hardware lock, it spins on the hardware lock flag until it receives the lock and thus can read the lock structure. Once the host controller reads the lock, it determines, at step 112 whether any other host processor has a lock on the target device. If another host controller does have a lock on the device, then, at step 113, a check is done to see if the controller which has the lock has the same GIDN (i.e. is related to the same host computer). If the lock is held by a controller with the same GIDN, a check is performed at step 114 as to whether the reserve state of the device lock is to be changed. If the reserve state is to be changed, processing continues at step 126 (as indicated by the arrow to the "C" bubble) where the device lock state is changed to include the new reserve. Note here, that other information may change in the lock structure as well. For example, the controller number associated with this request may be different than the previous controller even though they share the same GIDN. At this point, processing moves to step 190 where a lock device function is performed, thereby updating the contents of the device lock data structure. In addition, the previously set hardware lock is reset. At this point, the process moves to step 198 where the reserve state is updated and the process completes.

If at step 112, the device lock had not been set by another controller, processing moves to step 115 where a check is performed to see if the force flag had been set by the calling routing. If the force flag had not been set, processing moves to step 184 where the lock is left unchanged and the hardware lock on the memory location of the lock structure is released. At this point processing moves to step 194 which includes setting a value to indicate an error. The flow then moves to step 198 where the reserve state is updated and the process completes. If at step 115, the force flag had been set, a check is performed at step 116 to see if it the intention is to change the reserve state of the lock. If there is no intent to change the reserve state, the process moves to step 190 where the device is locked by updating the lock structure. Additionally, the hardware lock is released. At step 192, a value is set to indicate success and the process move to step 198 operating as described previously. If at step 116, there was an indication that the reserve state was to be changed, the process first moves to step 126 where the reserve state is set and the process then moves to step 190 as described above.

Another possible process flow occurs when neither the force flag nor the GIDN parameters have been passed by the calling routine. When this occurs, the process passes step 110 and a check is performed at step 120 to determine whether a parameter has been passed by the calling routine to indicate that a change in the reserve state is requested. If a change in reserve state is requested, the process moves to step 122 where a hardware lock is obtains as described above for step 111. After the hardware lock is set, a check is performed at step 124 to determine if the controller requesting the change in reserve state has the same GIDN as the GIDN value as the controller which previously set the lock. If the GIDNs do not match, processing moves to step 184 and proceeds as described previously. Alternately, if the GIDNs do match, then the process moves through steps 126, 190, 192, and 198 and described previously.

Yet another process flow for the lock mechanism of the present invention (which would here be considered the "normal" flow) passes through step 140 to step 160. At this point a check is performed to determine the mode of operation of the host as it relates to the storage system. As described previously, the host may operate in either single path or multi-path mode. The normal operation with respect to certain mainframe computers is multi-path mode. Thus, from step 160, the process would move to step 170 where the controller gets a hardware lock on the memory location associated with the device lock data structure. Then, at step 180, the lock status the device is checked. If the device is not locked, the process moves to steps 190, 192, and 198 as described previously. If however the device has already been locked, the GIDN number of the requesting controller and the owner of the lock are compared at step 181. If the GIDNs match, then at step 185, the existing reserve state is copied and the device is locked at step 190 (then continuing through steps 192 and 198 as above). If the lock state and GIDN combined don't match at step 181, the lock is checked to see if it is in the suspend state. If the lock is not in the suspend state, the lock attempt fails, with the process moving through steps 184, 194, and 198 as described previously. If the lock is in the suspend state, the lockword is compared as though it were in the multipath state at step 183. If this comparison is equal, the process continues through steps 185, 190, 192, and 198 to copy the reserve, set the lock, indicate success, and update the local reserve state respectively. If the comparison at step 183 is not equal, the lock attempt fails, with the process moving through steps 184, 194, and 198 as described previously.

If the host associated with the request is not in multi-path mode, as determined in step 116, then the process moves through steps 142 and 144 to get a hardware lock and check the device lock. If the device is not locked, the process moves through steps 190, 192, and 198 as described previously. If the device is locked, the ID of the locking controller is checked against the current requesting controller. If the values match, the process moves through steps 185, 190, 192, and 198 as described previously. If the controller ID values do not match, the lock attempt fails with the process moving through steps 184, 194, and 198 as described previously.

The present invention is broadly applicable to multi-processor data processing systems which access shared resources over single or multiple paths. For example, a multi-processor, multi-bus computer system may employ the lock features to allow the plurality processor to have coordinated access to the common resources (e.g. memory, I/O devices). Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A method of providing lock services for shared resources where said resources may be locked over several input/output (I/O) transactions, said method comprising the steps of:

providing, for every one of said resources, an associated lock structure stored in a memory accessible by a plurality of requesting devices, said lock structure including a lock portion a reserve portion and a state portion;

setting, by one of said requesting devices a hardware lock on a memory location corresponding to one of said lock structures associated with a desired resource;

examining the contents of said one lock structure to determine if another requesting device has previously locked said desired resource; and if no other requesting device has previously locked said desired resource, in a single transaction, writing data to said one lock structure lock information to said lock portion and reserve information to said reserve portion; and after said writing step, releasing said hardware lock.

2. A storage system comprising:

a plurality of storage devices;

a memory coupled to said plurality of storage devices;

a plurality of lock data structures associated corresponding to said plurality of storage devices, each of said lock record data structures including a lock portion a reserve portion; and a controller coupled to said memory and operable to gain a lock on one of said lock data structures and for modifying in a single transaction, and the associated lock portion and reserve portion of said one lock data structure.

3. The data storage system as in claim 2 wherein said controller further comprises a central processing unit and local memory and wherein said operation of said controller is responsive to software instructions read from said local memory and executed by said central processing unit.

4. The data storage system of claim 3 wherein said controller is configured to be coupled to a host computer and is responsive to instructions received therefrom for accessing said storage devices.

* * * * *